March 24, 1970  B. HÅBRO ET AL  3,502,858
SPOTLIGHTS

Filed May 18, 1966  4 Sheets-Sheet 1

INVENTORS
BERTIL HÅBRO
HARRY TRYSSING
BY
Strauch, Nolan, Neale, Nies & Bronaugh
ATTORNEYS

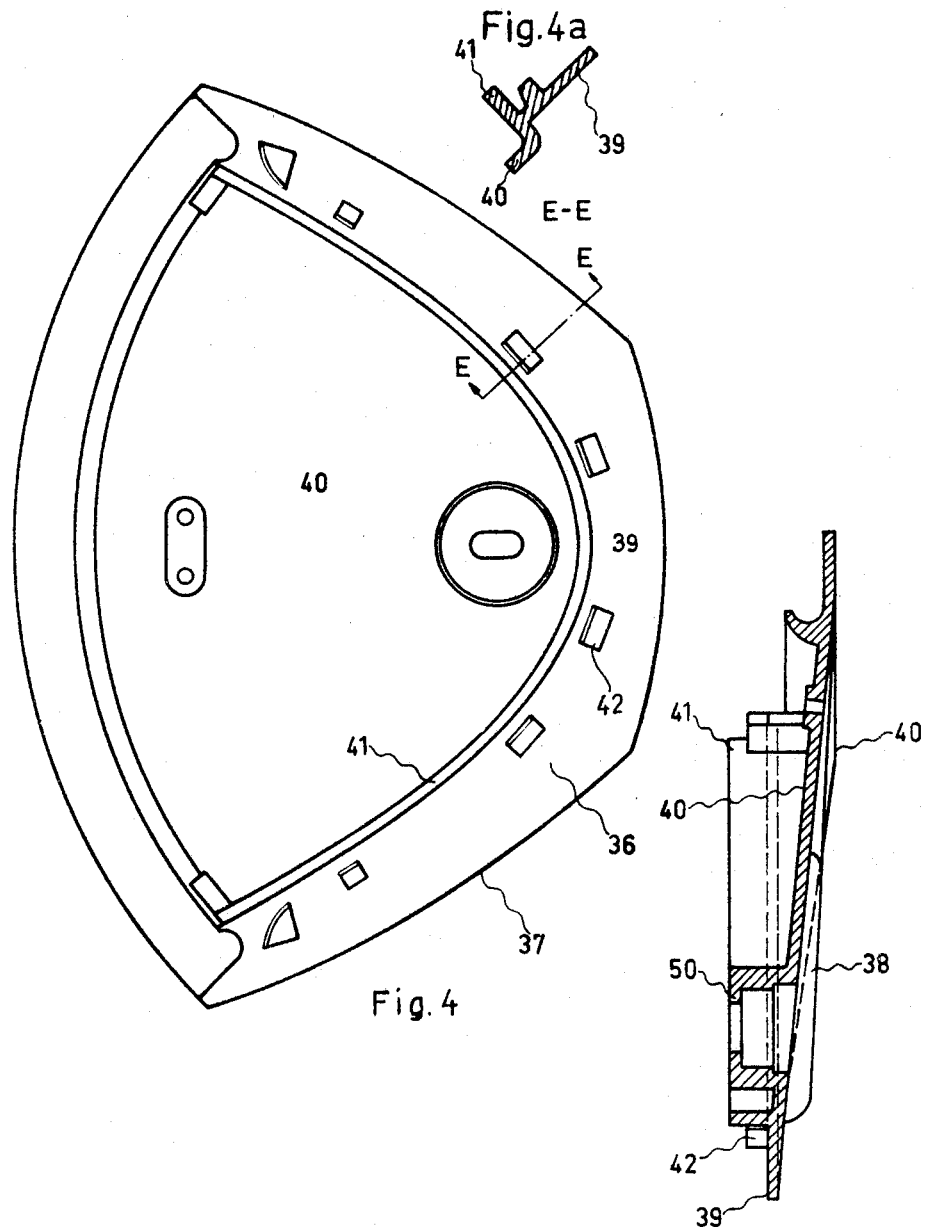

INVENTORS
BERTIL HÅBRO
HARRY TRYSSING

ATTORNEYS

United States Patent Office 3,502,858
Patented Mar. 24, 1970

3,502,858
SPOTLIGHTS
Bertil Håbro, Lidingo, and Harry Tryssing, Alvsjo, Sweden, assignors to Aktiebolaget Deltaljus, Stockholm, Sweden, a corporation of Sweden
Filed May 18, 1966, Ser. No. 551,122
Claims priority, application Sweden, May 26, 1965, 6,981/65
Int. Cl. F21p 5/00; F21v 29/00
U.S. Cl. 240—3                           3 Claims

ABSTRACT OF THE DISCLOSURE

A spotlight housing with a longitudinally extruded reflector mantle, which can be made of one or more pieces, a longitudinally extruded junction box handle piece interlocked by extruded interlocking tongue and groove fittings to mating tongue and groove fittings on the mantle. Cooling fins extend longitudinally in the extruded direction on both the mantle piece and the junction handle. End gables are used to close the open ends of the extruded mantle and the extruded junction handle.

BACKGROUND OF THE INVENTION

Spotlights, e.g. spotlights for illuminating sporting grounds, are frequently provided with linear light sources, said light sources being located at or close to the focal line of a reflecting mirror, said mirror having the general shape in cross-section of a parabolic or hyperbolic cylindrical surface. Said reflecting mirror is located in a housing which has a corresponding cylindrical shape. The housing is, as a rule, moulded of, for example, light-metal, and it is generally provided with gables which also are moulded and are integral with the mantle part of the housing. Further, the housing is generally provided with projecting cooling flanges on the outer mantle-surface thereof. In hitherto known spotlights, said cooling flanges extend in a direction at a right angle to the longitudinal axis of the cylindrical mirror, which means, that in the operating position, the cooling flanges are vertical. It has been assumed, that a better cooling effect would be obtained by such a device, because the heated air is considered to be streaming upwards between the cooling flanges.

A spotlight of that kind has the disadvantage that it is rather expensive, because the housing has to be moulded, for example, in a sand mould, and its surface has to be rubbed of and provided with surface-finish in a conventional way.

SUMMARY OF THE INVENTION

According to the present invention, it is possible to make the housing of the spotlight in a much less expensive and simpler way, which is particularly suited for mass production and very advanced automation.

The invention relates to a housing for a spotlight, comprising a cylindrical mantle part, wherein said mantle part consists of at least one cut piece of a continuously casted or extrusion-pressed profiled rod.

The invention is, among others, based on the knowledge, that the cooling flanges very well may be arranged in the longitudinal direction of the spotlight housing, so that they may be located in planes, which project radially from the cylindrical mantle surface of the housing. In that case, the air can not stream past the mantle surface and between the cooling flanges because of the heating of the air. But, surprisingly, this fact has proved to be of very little importance. In the practical case, the air is seldom or never standing still. The movements in the air which may be present because of different circumstances, such as wind, are generally of horizontal direction. Therefore, when the cooling flanges are located horizontally, the air will stream between the cooling flanges in the horizontal direction, whereby cooling of the flanges and of the mantle surface will take place. It has been found out, that this cooling is at least equal to or, in many cases, better than the cooling which is obtained by conventionally arranged, vertical cooling flanges.

According to a further embodiment of the invention, there is a second housing forming a junction box, which encloses the terminal board of the spotlight, and which is fastened outside the spotlight housing. This junction box is also made of a cut piece of a continuously cast or extrusion-pressed profiled rod, e.g. of light-metal. The junction box may be fastened to the spotlight housing by means of grooves which are provided at one of said parts in which ribs, which are provided on the other part, are inserted.

The invention will now be described more in detail, reference being had to the accompanied drawings, in which FIG. 1 is a perspective view of the spotlight according to the invention as viewed from one side and from behind, FIG. 2 is a cross-section of the spotlight housing and a junction box for a terminal board which is attached to the spotlight housing, FIG. 3 is a gable, forming a part of the spotlight housing, as viewed from the outside, FIG. 4 illustrates the same gable as viewed from the inside thereof, FIGURE 4a is a cross section of the gable along line E—E of FIGURE 4.

FIG. 5 is the same gable in cross-section,

Figure 1:
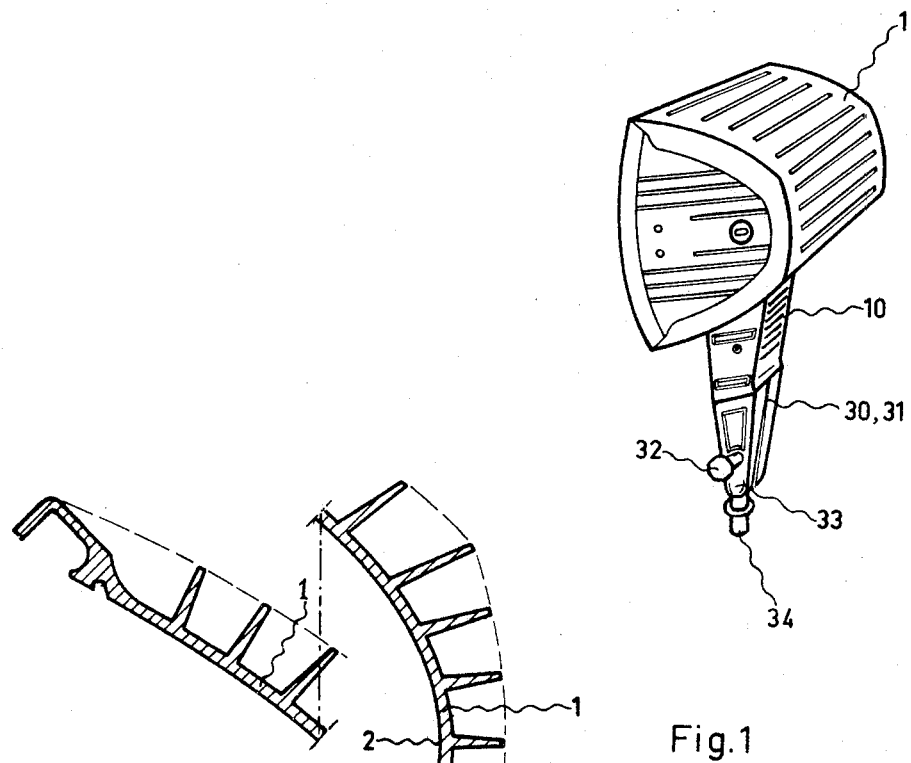
Figure 2:
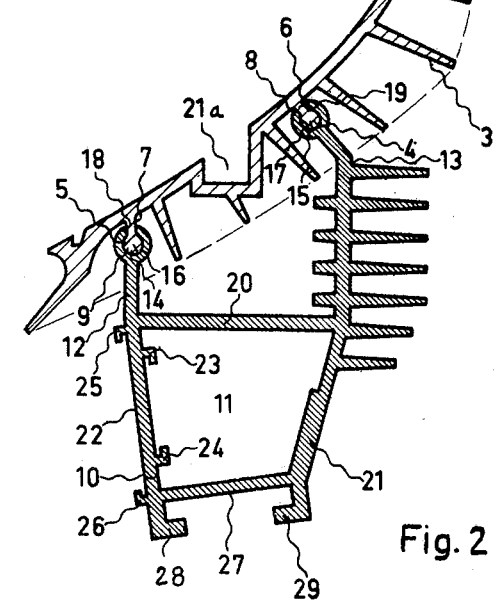

In the drawing, 1 designates the mantle part of a housing for a spotlight. The mantle-part 1 has an inner surface 2 which is shaped substantially as a parabolic cylinder. To that cylindrical surface a reflecting mirror can be attached. Such a reflecting mirror may have a shape which may differ from the shape of the surface 2. The reflecting mirror may also be provided with longitudinal folds or offsets in a manner known per se. By this means, the mantle part 1 may be used for different reflectors which give different dispersing angles in a vertical direction of the light beam generated by the spotlight.

The mantle part 1 is provided, on the outside thereof, with longitudinal cooling flanges. Further, the mantle part 1 is provided with two longitudinal ribs or tongues 4 and 5 which, as viewed in cross-section, have a narrower, inner portion 6 and 7, respectively, and an outer, wider portion 8 and 9, respectively.

According to the invention, the mantle part 1 consists of a cut piece of a continuously cast or extrusion-pressed profile rod, such a profiled aluminum or a profile of any other light metal. Therefore, the mantle part is very inexpensive, and it may be produced with very exact dimensions. Further, the surface of the mantle part 1 is smooth and even, and it may easily be provided with a layer of protecting finish of paint or varnish.

The junction box 10 for a terminal board is connected to the mantle part 1. In said junction box the different electrical connecting means for the spotlight are located. Also the junction box consists of a cut piece of a continuously cast or extrusion-pressed profiled rod of, for example, light metal. As viewed in cross section, said profile has a trapeziform portion 11, and two arms 12, 13 projecting from said portion. The ends of said arms are provided with grooves 14, 15, respectively, each of said grooves having a wider inner portion 16, 17 and a narrower outer portion 18, 19. The grooves 14, 15 are fitted to the ribs or tongues 4, 5 on the mantle part of the spotlight housing 1, so that the junction box 10 for the terminal board may be fastened to the mantle part of the spotlight housing by pushing the grooves 14, 15 over the ribs 4, 5 from one end of the mantle part 1.

Before the junction box is fastened to the mantle part of the spotlight housing, the last mentioned mantle part should be provided with an opening, opposite to the place, where the junction box should be located, for the conductors which connect the terminals in the junction box to the spotlight lamp inside the mantle part of the housing for the spotlight. A corresponding opening should also be provided in the wall part 20 of the junction box 10.

The opening in the mantle part 1 should be located at the bottom of the channel-formed portion 21a which is enclosed by the arms 12, 13 of the junction box. This channel-formed portion provides a space for the cables which are coming from the ends from the tube-shaped lamp to said opening which is located just opposite to the junction box.

Between the mantle part 1 and the junction box 10, the conductors are surrounded by an aluminium tube, the ends of which are inserted into said openings in the mantle part for the spotlight and in the wall of the junction box, and which are hermetically sealed to said devices by expanding the ends of said tube.

The junction box 10 has a rear wall 21, which is thicker than the other walls. In this rear wall there is an opening provided, in which a bushing is inserted, which serves for leading-in the current supply cable.

At the inner surface of the front wall part 22 of the junction box, there are two fastening ribs 23, 24, which serve to keep the terminal board in place. On the outer surface of said wall portion there are two fastening ribs 25, 26, which serve the purpose of keeping a marking label or a sign in place.

The terminal board may be attached to a metal plate which can be pushed in between the ribs 23, 24. The same metal plate may also be provided with clamping means for the cable which is connected to the housing for the terminal board.

The electrical connection and the fastening of the cable in the clamping means should preferably be carried out before the metal plate when the terminal board is pushed in between the ribs 23, 24. The plate is thereafter pushed in against an abutment, which is formed at one end of the housing 10, by clamping the one end of the grooves in one or more of the ribs 23, 24 together. After inserting the plate, the gables are attached to the junction box, which will be described in the following.

The bottom wall portion 27 of the junction box is provided with two rigid fastening ribs 28, 29 which serve the purpose of fastening a clamping member 30, 31 for the spotlight.

Figure 8:
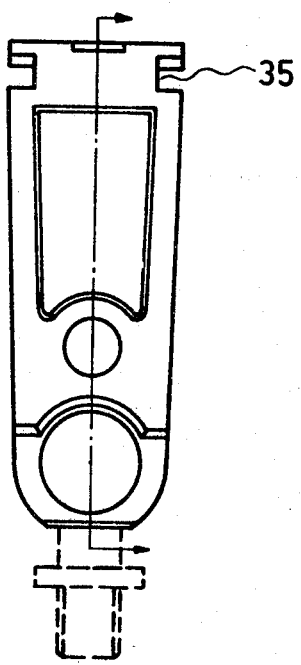
FIG. 8 is a fastening member which is connected to the junction box, said fastening member being provided with a socket for a ball and socket joint.
Figure 9:
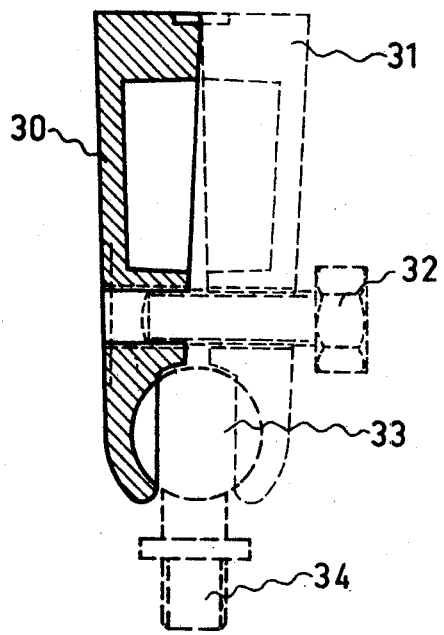
FIG. 9 is a cross-section of the fastening member shown in FIG. 8, viewed at a right angle as compared to FIG. 8.

The clamping member 30, 31 for the spotlight is illustrated more in detail in FIGS. 8 and 9. It comprises two parts 30 and 31 which may be made from light metal by chilled casting, die casting or the like. The parts 30 and 31 are kept together by means of a screw 32, which runs freely through the part 31 and is threaded in the part 30. The bottom portions of the parts 30 and 31 are formed as cup-shaped sockets for enclosing a ball 33, which is fastened to a rod 34, said rod being carried by a framework, not shown.

The upper portion of the parts 30 and 31 are provided with grooves 35. In each part the groove 35 is somewhat wedge-shaped and of such a form, that when the screw 32 has been tightened, there will be a clamping action between the walls of the grooves 35 and the ribs 28, 29, in order that the fastening member may be securely kept in place to the junction box.

Figure 3:
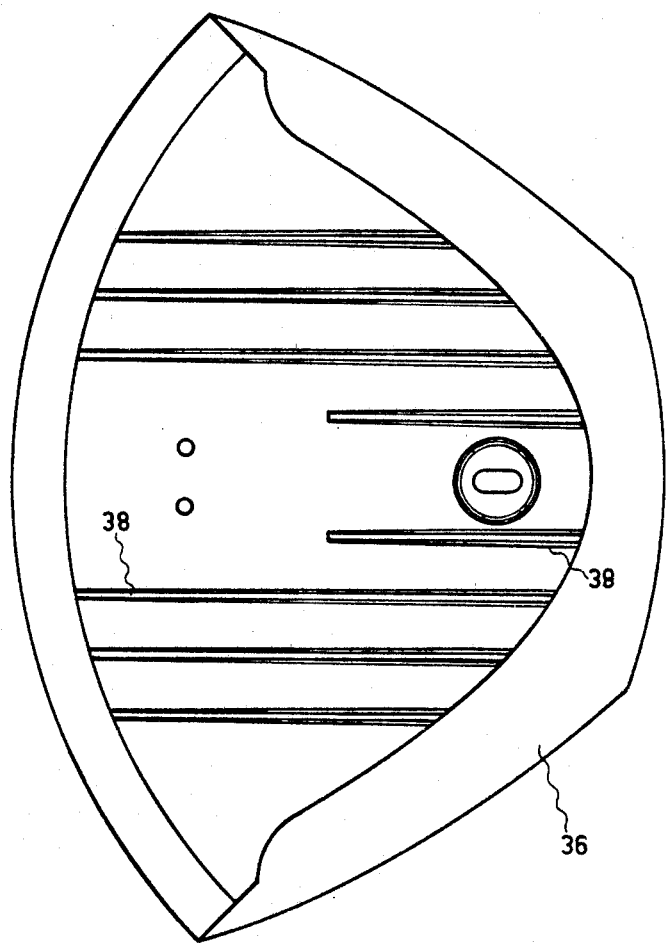

In order to close the mantle portion of the housing for the spotlight at the ends thereof, gables 36 are provided. There are one left-hand gable and one right-hand gable. In FIGS. 3 to 5 the gable which is located at the left-hand, when the spotlight is viewed from the rear, is illustrated more in detail.

The gable 36 consists of a plate 37 on the outside of which cooling flanges 38 are provided. The plate 37 has a plane rim portion 39, which is arranged to abut against the end of the mantle part 1. The outer contours of the rim portion has such a shape, that it follows a line drawn through the summits of the cooling flanges of the mantle portion 1. Further, the plate 37 has an elevated middle portion 40, which is oblique with respect to the plane of the rim portion and which has its lowermost part located at the rear portion of the gable and its top part located at the front portion of the gable.

The gable 36 is, at the inside thereof, provided with a flange 41, the outer side of which is matched to the contours of the inside of the mantle surface 1 and a number of projections 42 outside of the flange, at such a distance from the latter, that the end of the mantle surface may be inserted between said projections and the flange. The gables 36 may be made from light metal, for example by means of chilled casting or die casting.

The gables are fastened to the mantle part by screws or rivets, which are inserted in openings provided through the mantle part and through the flange 41 on each gable. In order to obtain sufficient sealing between the gables and the mantle portion, there may be a sealing means provided between the gables and the abutting parts of the mantle portion, for example a self-vulcanizing solution of silicon. Each gable has a cylindrical projection 50 at the inside of the gable. To the projection 50, there may be a tube (not shown) attached, which also may be made of a cut piece of an extruded or continuously cast profile of, for example, light metal. Between those tubes, which form the gables project against each other, the elongated lamp of the spot-light may be supported by means of suitable lamp sockets.

Figure 6:
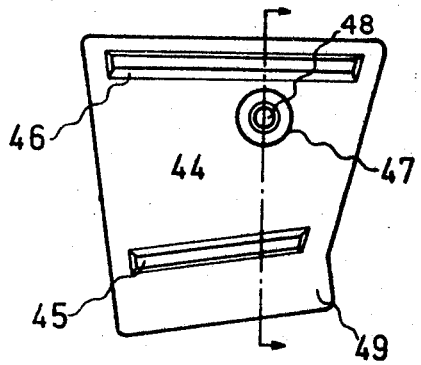
FIG. 6 is a gable belonging to the junction box, as viewed from the outside.
Figure 7:
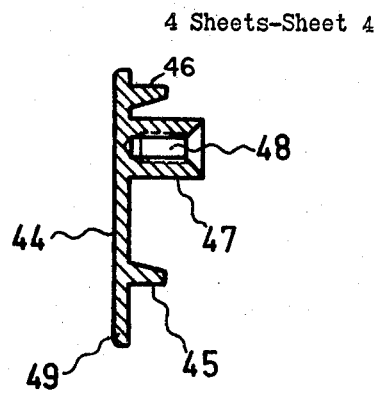
FIG. 7 is the same gable in cross-section.

Also the junction box 10 is provided with gables 43. The right-hand gable is illustrated in FIGS. 6 and 7.

The gable 43 consists of a plate 44, the outside of which is plane and the inside of which is provided with two ridges 45, 46, which are matched to the inside dimensions of the housing, so that they define the position of the gable with respect to said housing. Further, the right-hand gable has a projecting bushing 47 at the inside of the gable, in which a threaded opening 48 is provided.

The left-hand gable, which is not shown, has at the corresponding place an opening through the gable, so that the gables, when they are attached to the junction box, may be kept together by means of a bolt, which goes through the left-hand gable and which is threaded into the bushing 47 of the right-hand gable.

The gables 43 of the junction box are elongated downwards by means of a portion 49, which covers the grooves in the ribs 28, 29. By this means, the fastening member 30, 31 will be prevented from sliding out from the grooves.

Also the gables 43 of the junction box may be made from light metal by means of chilled casting or die casting.

In order that also the junction box should be sufficiently sealed and watertight, it is possible to provide a suitable sealing means or a suitable packing between the surfaces of the gables and the mantle part of the junction box, which are abutting against each other.

The invention may be modified in different ways within the scope of the appended claims. Thus, it is possible, for example, for producing very big spotlights, to divide the mantle portions into two or more segments or sections, each section comprising a cut piece of an extruded or continuously cast profile of, for example, a light metal. The different sections may be attached to each other by, for example, longitudinal grooves in one of those sections and longitudinal ribs in the other section, said grooves and said ribs being of about the same shape as the grooves 14, 15, in the junction box and the ribs 4, 5 on the mantle portion 1. In the joints between the different sections a suitable sealing may be provided.

The different pieces of extruded or continuously cast profiles may, in some cases, be made of some other material than light metal. It is possible to use a synthetic resin of a suitable kind for spotlights, in which the temperature rise is not too big.

What is claimed is:

1. A spotlight housing comprising: a reflector mantle part consisting of at least one cut piece of a continuously linearly profiled rod and a junction box mantle part consisting of at least one cut piece of a continuously linearly profiled rod, and means comprising engaging linearly profiled interlocking tongue and groove devices securing said two parts together, said reflecting mantle part being provided with part of said interlocking devices and said junction box mantle part being provided with another part of said interlocking devices which are complementary to said part of the interlocking devices of said reflector mantle part, and said interlocking devices permit said junction box mantle part to be secured to said reflector mantle part by slidably interfitting one of the mantle parts onto the other mantle part in the longitudinal direction of said mantle parts.

2. A spotlight housing according to claim 1, wherein the groove portions of said interlocking devices have a cross-section with a relatively narrow outer portion and a broader inner portion and that the tongue portions of said devices correspondingly have a cross-section with a broader outer portion and a narrower inner portion.

3. A spotlight housing comprising: a reflector mantle part consisting of at least one cut piece of a continuously linearly profiled rod and a junction box mantle part consisting of at least one cut piece of a continuously linearly profiled rod, means including engaging linearly profiled portions of both said reflector mantle part and said junction box mantle part securing said two parts together, and said junction box mantle part being provided with cooling flanges, said cooling flanges being located parallel to the focal line of the spotlight housing.

References Cited

UNITED STATES PATENTS

| | | | |
|---|---|---|---|
| 2,857,508 | 10/1958 | Klugman | 240—47 |
| 3,103,314 | 9/1963 | Heisler | 240—47 XR |
| 3,152,764 | 10/1964 | Rice | 240—47 XR |
| 3,265,885 | 8/1966 | Porter | 240—47 |
| 3,099,404 | 7/1963 | Kaufman et al. | 240—78 |

FOREIGN PATENTS

| | | |
|---|---|---|
| 555,538 | 6/1957 | Italy. |

NORTON ANSHER, Primary Examiner

F. L. BRAUN, Assistant Examiner

U.S. Cl. X.R.

240—47